United States Patent
Bialek et al.

(10) Patent No.: US 7,313,367 B2
(45) Date of Patent: Dec. 25, 2007

(54) SWITCHED MULTIPLEXER METHOD TO COMBINE MULTIPLE BROADBAND RF SOURCES

(75) Inventors: Edward J. Bialek, Buffalo, NY (US); James J. Heimbueger, Buffalo, NY (US); Christopher J. Irwin, Buffalo, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 426 days.

(21) Appl. No.: 11/079,796

(22) Filed: Mar. 14, 2005

(65) Prior Publication Data

US 2006/0205352 A1    Sep. 14, 2006

(51) Int. Cl.
*H04B 1/00* (2006.01)
*H04B 15/00* (2006.01)

(52) U.S. Cl. .................. 455/63.3; 455/63.4; 455/73; 455/78; 455/83

(58) Field of Classification Search ............... 455/63.3, 455/63.4, 73, 78, 83, 103, 105, 121, 552.1, 455/553.1
See application file for complete search history.

(56) References Cited

U.S. PATENT DOCUMENTS

| | | | |
|---|---|---|---|
| 4,272,730 A | 6/1981 | Digiovanni | |
| 4,328,499 A | 5/1982 | Anderson et al. | |
| 4,363,139 A | 12/1982 | Sullivan, Jr. | |
| 4,535,286 A | 8/1985 | Sullivan, Jr. | |
| 4,641,368 A | 2/1987 | Sullivan, Jr. | |
| 4,700,191 A | 10/1987 | Manor | |
| 4,728,958 A | 3/1988 | Choate | |
| 5,287,543 A | 2/1994 | Wolkstein | |
| 5,508,661 A | 4/1996 | Keane et al. | |
| 5,640,694 A | 6/1997 | Milton, Jr. | |
| 5,838,675 A | 11/1998 | Rauscher | |
| 5,940,029 A * | 8/1999 | Ninomiya et al. | 342/372 |
| 6,519,773 B1 | 2/2003 | Ahmed et al. | |
| 6,781,968 B1 | 8/2004 | Colella et al. | |
| 6,970,681 B2 * | 11/2005 | Darabi et al. | 455/73 |
| 7,181,175 B2 * | 2/2007 | Nimmo-Smith et al. | 455/101 |
| 2004/0041554 A1 | 3/2004 | Miyauchi | |
| 2005/0054383 A1 * | 3/2005 | Webster et al. | 455/562.1 |

* cited by examiner

*Primary Examiner*—Matthew Anderson
*Assistant Examiner*—Tuan Pham
(74) *Attorney, Agent, or Firm*—Stetina Brunda Garred and Brucker (57) ABSTRACT

Provided is a switched multiplexer configured to combine first, second, third and fourth signal paths each covering a sub-octave in a frequency range of from about 2 to about 18 GHz and to remove transmitter harmonics of an input signal to create a stable output impedance across the frequency range. The switched multiplexer comprises a transmit switch, a first diplexer and a power combiner. The first diplexer is connected in parallel with a second diplexer. The first diplexer comprises first and second signal paths. The second diplexer comprises third and fourth signal paths. Each one of the first, second and third signal paths include respective ones of the first switch, a second switch and a third switch, each interconnected to respective ones of a first signal path high-pass filter, second signal path low-pass filter and third signal path low-pass filter by respective ones of a first, second and third filter. Each one of the first, second and third filters have a respective filter capability in the range of from about 6-10.4 GHz, 2-3.5 GHz, and 3.5-6 GHz.

26 Claims, 2 Drawing Sheets

SWITCHED MULTIPLEXER METHOD TO COMBINE MULTIPLE BROADBAND RF SOURCES

STATEMENT RE: FEDERALLY SPONSORED RESEARCH/DEVELOPMENT

The present invention was developed under U.S. Government Contract No. 131980. Accordingly, the United States Government may have certain rights in the present invention.

CROSS-REFERENCE TO RELATED APPLICATIONS (Not Applicable)

BACKGROUND OF THE INVENTION

The present invention relates generally to radio frequency (RF) signal processing and, more particularly, to a uniquely configured switched multiplexer that uses a bank of filters to filter a signal generated by a multi-octave transmitter whose frequency may vary over time. The switched multiplexer is also adapted to create a stable output impedance regardless of which one of the filters among the bank is selected, across the entire frequency range (e.g., 2-18 GHz) in order to reduce the phase and amplitude error of the signal.

In the field of RF signal processing, multi-octave transmitters are used wherein it is necessary to filter off transmitter harmonics associated with the RF signal. More specifically, it is typically necessary to filter off or suppress second and third harmonics in order to prevent interference of the signal with other radio systems. In multi-octave systems, such filtering of secondary and third harmonics cannot be performed by a fixed filter. For example, a sub-octave transmitter might be configured to operate in the range from about 2-3 GHz and have a second harmonic which is in the range of from about 4-6 GHz. Including a 3 GHz low-pass filter (LPF) allows passage of frequencies that are below 3 GHz while blocking signals that are above 3 GHz. However, using a fixed LPF for a multi-octave transmitter operating in the range from about 2-18 GHz would require a rating of about 18 GHz in order to prevent obstruction of the desired signal. Unfortunately, the use of an 18 GHz filter would also allow passage of the second harmonic from the transmitter when operating in the range of from about 2-9 GHz.

Figure 1:
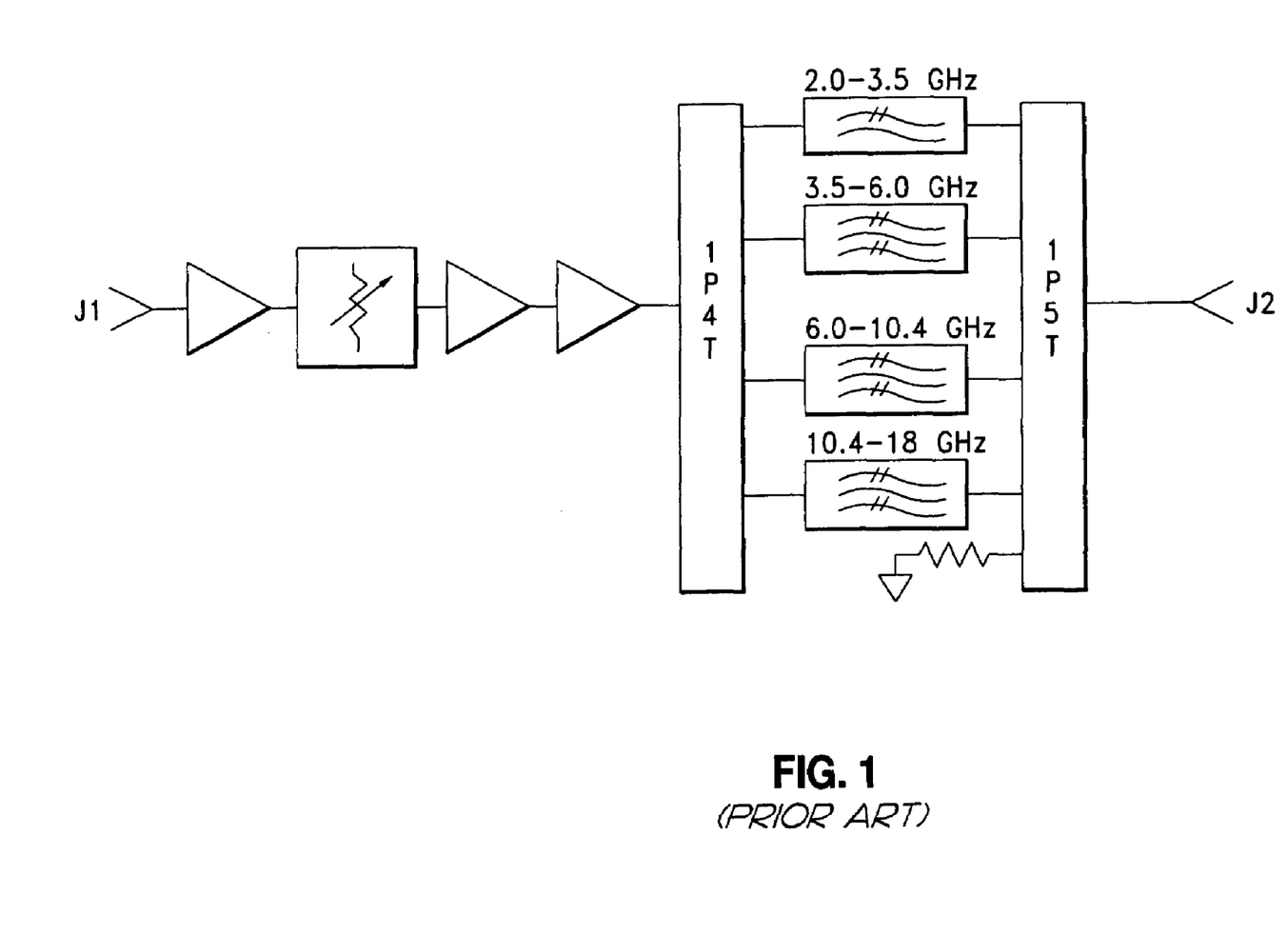
FIG. 1 is a block diagram schematically illustrating a prior art filter or switched multiplexer system configured as a Switch-Filter-Switch system.

Attempts to overcome the above-described problem include providing a bank of selectable filters to reduce the second and third harmonics. For example, one prior art system shown in FIG. 1 is configured for High Band (HB) Direction Finding (DF) wherein a Switch-Filter-Switch (SFS) is provided in order to select only the desired filter in the system so as to reduce the second and third harmonics of the fundamental frequency down to acceptable power levels. The arrangement as shown in FIG. 1 operates in a satisfactory manner in amplitude-only applications in which the DF legs are normally used.

Unfortunately, switches such as those used in FIG. 1, (i.e., the single-pole-quadruple-throw [1P4T]) switch and the single-pole-quintuple-throw [1P5T] switch) are typically reflective. Because of the reflective nature of such switches, a non-reflective output impedance match can only be obtained over the selected filter's frequency range. For example, if the filter that passes signals from about 2.0-3.5 GHz is selected by one of the switches, the output impedance match is poor in frequency ranges for the remaining three filters. Furthermore, when a different filter band is selected, such as the 6.0-10.4 GHz filter shown in FIG. 1, the output impedance of the 2-18 GHz system will change. In a multi-channel combining network, the changing output impedance will result in phase and amplitude errors in the signal each time the switch (e.g., the 1P5T switch of FIG. 1) changes which unfortunately results in errors in the DF capability of a system.

As can be seen, there exists a need in the art for a switched multiplexer that is configured to provide a consistent output impedance so as to minimize phase shifting when different band pass filters are selected from among a bank of filters. Furthermore, there exists a need in the art for a switched multiplexer that has the capability to improve the HB DF Leg's harmonic performance. More specifically, there exists a need in the art for a switched multiplexer wherein switches included in the system do not add any undesirable harmonics that are not filtered.

BRIEF SUMMARY OF THE INVENTION

Provided is a switched multiplexer configured to operate in a frequency range and which is specifically adapted to remove transmitter harmonics of an input signal to thereby create a stable output impedance across the frequency range.

In its broadest sense, the switched multiplexer comprises a transmit switch, a bank of diplexers connected in parallel with one another, and a power combiner connected to the bank of diplexers. The switched multiplexer is specifically configured to combine a quantity of signal paths each covering a sub-octave in a frequency range of from $f_{min}$ to $f_{max}$. The low end of the frequency range is represented by $f_{min}$. The upper end of the frequency range is represented by $f_{max}$. The switched multiplexer is configured to remove transmitter harmonics of a known input signal in order to create a stable output impedance across the entire frequency range.

The transmit switch receives the input signal and routes the transmit signal in response to the input signal. The bank of diplexers are connected in parallel with one another with each one of the diplexers being comprised of a pair of the signal paths also connected in parallel with one another. The quantity of signal paths included in the bank of diplexers is approximately determined by the following formula: n=[log $(f_{max}/f_{min})$]/[log2]. After solving for n, the quantity of signal paths is then finally determined by rounding, up the quantity n to the nearest even integer.

In an exemplary embodiment wherein the frequency range is from 2 to 18 GHz, the required number of signal paths as determined by the above formula and rounded up the nearest even integer is four signal paths. In this arrangement, the switched multiplexer comprises a transmit switch, a first diplexer connected in parallel with a second diplexer, and a power combiner connected to the first and second diplexers. The first diplexer includes a first signal path connected in parallel with a second signal path and which are terminated at a first diplexer resistive attenuator. The second diplexer is comprised of third and fourth signal paths which are connected in parallel with one another. The first, second, third and fourth signal paths include respective ones of a first, second, third and fourth switch.

A transmitter may be included with the switched multiplexer and may be configured to generate an input signal for delivery to the transmit switch at a common port of a transmit switch. The transmit switch is configured to receive the input signal from the transmitter and to generate a transmit signal in response to the input signal. The transmit switch directs the transmit signal to one of four possible outputs and is configured to connect the common port to one of four outputs of the transmit switch.

The first signal path of the first diplexer includes the first switch that is interconnected to a first filter by a first signal path high-pass filter (HPF). The first filter preferably has a filtering capability in the range of from about 6-10.4 GHz. Likewise, the second signal path includes a second switch that is interconnected to a second filter by a second signal path low-pass filter (LPF). The second filter preferably has a filtering capability in the range of from about 2-3.5 GHz. The third signal path includes a third switch which is connected successively to a third filter, a third signal path resistive attenuator and a third signal path LPF. The third filter preferably has a filtering capability in the range of from about 3.5-6 GHz. The fourth signal path includes a fourth switch interconnected to a fourth signal path HPF.

Each one of the first, second, third and fourth switches receives the transmit signal from the transmit switch at respective input terminals and are configured to pass the transmit signal onto respective ones of the first signal path HPF, the second signal path LPF, the third signal path resistive attenuator and the fourth signal path HPF. The transmit signal is provided from an output terminal of each one of the first, second, third and fourth switches.

The transmitter and/or the transmit switch may control or direct the transmit signal to the appropriate one of the first, second, third and fourth switches. Remaining ones of the first, second, third and fourth switches which are not selected by the transmit switch terminate their input signal into a resistive load. By including the resistive termination with at least three of the first, second, third and fourth switches, a stable output impedance is provided across the frequency band which is conveyed by the particular one of the signal path's filter (e.g., 2.0-3.5 GHz) as may be seen from the point of view of the output pin. More specifically, each one of the first, second, third and fourth filters are either presented with a good 50-ohm termination or an actual 50-ohm resistance is included with the transmitter itself. Such resistive termination stabilizes each one of the first, second, third and fourth filter's output impedance which therefore stabilizes the switched multiplexer output impedance.

Each one of the first, second and third filters passes or transmits the desired portion of the transmit signal within that particular filter's pass band (e.g., 2.0-3.5 GHz). In addition, each one of the first, second and third filters also rejects signal components that fall outside of the particular pass band (e.g., <2.0 GHz, >3.5 GHz) such that each of the first, second and third filters may be viewed as conductive within the pass band and also reflective. Because each of the first, second and third filters are either terminated by the resistor (or the transmitter's output impedance), there exists a non-reflective component within all portions of the multi-octave frequency band that are then provided to an output pin of the power combiner.

The first diplexer and the second diplexer combine standard frequency bands with minimal loss (e.g., <1 dB) to respective ones of the first, second, third and fourth filters' pass band. Such an arrangement avoids a 3 dB or more loss associated with a broadband combiner. Furthermore, the arrangement of the first and second diplexers avoids the disturbance of filter impedances in the rejection band (i.e., out of the pass band). Both of the signal paths which combine to form each of the first and second diplexers have non-adjacent frequency ranges (e.g., 2-3.5 GHz and 6-10.4 GHz) such that a "gap" (e.g., 3.5-6 GHz) is created, allowing a realizable diplexer to be designed with a crossover point (e.g., 4 GHz) that is within the "gap".

Each one of the first signal path HPF and second signal path LPF operates at about 4 GHz. Likewise, each one of the third signal path LPF and fourth signal path HPF operates at about 8 GHz. The first diplexer creates a transparent path within the range of from about 2.0 to about 3.5 GHz and from about 6.0 to about 10.4 GHz, respectively. The first diplexer thereby create a near-zero loss within the frequency bands of the first and second signal paths and presents a reflective impedance outside the first and second signal paths. Likewise, the second diplexer created a transparent path within the range of from about 3.5 to about 6.0 GHz and from about 10.4 to about 18.0 GHz, respectively. The second diplexer also creates near-zero loss within the frequency bands of the third and fourth signal paths and also present a reflective impedance that is outside bands of the third and fourth signal paths.

The first diplexer includes a first diplexer resistive attenuator which connects the first and second signal paths together and which attenuates a diplexed signal produced by the first diplexer by about 3 dB in order to reduce reflections from the first and second signal path filter pair at frequencies outside the pass bands (e.g., 3.5-6.0 GHz, >10.4 GHz). Likewise, the third signal path resistive attenuator attenuates a filtered signal by about 3 dB in order to reduce the reflection from the third filter outside of its pass band (e.g., <3.5 GHz, >6 GHz).

The power combiner sums inputs received from each of the first and second diplexers and creates a multi-octave output (e.g., 2.0-18 GHz) at the output pin of the power combiner such that nominal power loss through the power combiner is about 3 dB. In this manner, measurement of the output impedance is substantially constant in the range of from about 2 to about 18 GHz, regardless of which of the first, second, third or fourth signal paths are selected by the transmit switch.

BRIEF DESCRIPTION OF THE DRAWINGS

These as well as other features of the present invention will become more apparent upon reference to the drawings wherein.

DETAILED DESCRIPTION OF THE INVENTION

Referring now to the drawings wherein the showings are for purposes of illustrating the present invention and not for purposes of limiting the same, provided is a uniquely configured switched multiplexer 10 configured to operate in a frequency range of from $f_{min}$ to $f_{max}$ and to remove transmitter 12 harmonics of an input signal 14 to thereby create a stable output impedance across the frequency range.

In its broadest sense, the switched multiplexer 10 comprises a transmit switch 16, a bank of diplexers connected in parallel with one another, and a power combiner 62 connected to the bank of diplexers. The switched multiplexer 10 is specifically configured to combine a quantity of signal paths 76 each covering a sub-octave in the frequency range of from $f_{min}$ to $f_{max}$. The low end of the frequency range is represented by $f_{min}$. The upper end of the frequency range is represented by $f_{max}$. The switched multiplexer 10 is configured to remove transmitter 12 harmonics of a known input signal 14 in order to create a stable output impedance across the entire frequency range. The transmit switch 16 receives the input signal 14 and generates a transmit signal 18 in response to the input signal 14. The bank of diplexers are connected in parallel with one another with each one of the diplexers being comprised of a pair of the signal paths 76 also connected in parallel with one another.

The quantity of signal paths 76 included in the bank of diplexers is approximately determined by the following formula: $n=[\log(f_{max}/f_{min})]/[\log 2]$. After solving for n, the quantity of signal paths 76 is then finally determined by rounding up the quantity n to the nearest even integer. For example, for the frequency range of 2-50 GHz, $f_{min}$ is equivalent to 2 GHz and $f_{max}$ is equivalent to 50 GHz. Applying the above-recited formula, the quantity of signal paths 76 represented by the character "n" is equivalent to $[\log(50/2)]/[\log 2]$ which equals 4.64. When the value for n is rounded up to the nearest whole even integer, a quantity of six of the signal paths 76 is required for the frequency range of 2-50 GHz.

Each one of the signal paths 76 includes a switch 80 and a signal path filter 78 interconnected by one of a low-pass filter 82 and a high-pass filter 84. In the switched multiplexer 10, the signal path 76 which covers the highest pass band may exclude or omit the signal path filter 78. However, such signal path filter 78 may optionally be included in the signal path 76 if desired. Each one of the signal paths 76 in each one of the diplexers includes the switch 80 and the signal path filter 78 interconnected by the low-pass filter 82 while the other one of the signal paths 76 of the diplexers includes the switch 80 and the signal path filter 78 interconnected by the high-pass filter 84.

The pass bands of the signal path filters 78 are preferably arranged in geometric progression to cover the entire frequency range of from $f_{min}$ to $f_{max}$. More specifically, the pass bands of the signal path filters 78 are arranged to cover the entire frequency range with the lowest pass band being assigned to the first signal path 34 and the next higher pass band being assigned to the next signal path 76 on up to the $n^{th}$ one of the signal paths 76. Each pass band preferably has a band width that is equal to about twice the band width of its next lower pass band. For the frequency range of 2 to 50 GHz, six separate signal paths 76 must be included in the switched multiplexer 10. Because each diplexer includes a pair of the signal paths 76, the switched multiplexer 10 for the frequency range of 2 to 50 GHz will comprise three diplexers.

In an exemplary arrangement of the geometric progression of the pass band of the signal paths 76 for the case where the frequency range is from 2 to 50 GHz, the lowest pass band may range from about 2 to 3.5 GHz, the second pass band may range from about 3.5 to 6.0 GHz, the third pass band may range from about 6.0 to 10.4 GHz, the pass band may range from about 10.4 to 18.0 GHz, the fifth pass band may range from about 18.0 to 30.0 GHz, and the sixth and final pass band signal path may have a pass band ranging from about 30.0 to about 50.0 GHz.

In addition, it is contemplated that the pass bands of the signal paths 76 may be adjacent to one another as in the example described immediately above. Alternatively, the pass bands may have overlapping frequencies. For example of overlapping pass bands for the frequency range of from 2-50 GHz, the lowest pass band may be from 2 to 3.7 GHz while the second pass band may have a frequency in the range of from 3.3 to 9.5 GHz such that there is an overlap of 3.3 GHz and 3.7 GHz between the pass bands. In addition, the pair of signal paths 76 assigned to each one of the diplexers is preferably selected such that a frequency gap exists between the pass bands of the respective ones of the signal path filters 78 of the pair.

For example, the first diplexer 20 may include the signal path 76 having the lowest pass band and the signal path 76 having the fourth pass band. For the frequency range of from 2-50 GHz, the first diplexer 20 may combine the first signal path 76 (operating in the range of 2 to 3.5 GHz) with the fourth signal path 40 (operating in the range of 10.4 to 18.0 GHz). Likewise, the second signal path 36 operating in the range of 3.5 to 6.0 GHz may be combined with the fifth signal path operating in the range of 18.0 to 30.0 GHz. Finally, the third signal path 38 operating in the range of 6.0 to 10.4 GHz may be combined with the sixth signal path operating in the range of 30.0 to 50.0 GHz. However, it is contemplated that the signal paths 76 of each one of the diplexers may be combined in any manner provided that there is a gap between the frequencies of the pass bands of the pair of signal paths 76.

Each one of the low-pass and high-pass filters 82, 84 preferably has a corner frequency falling between the frequency gap between the pass bands of the signal paths 76 of each one of the pairs. For example, for the frequency range of from 2-50 GHz where the first signal path 34 (i.e., having a range of 2 to 3.5 GHz) is combined with the fourth signal path 40 (i.e., operating in the range of 10.4 to 18 GHz), there is a gap of 3.5 to 10.4 GHz between the first and fourth pass bands. Therefore, the corner frequency for each one of the low-pass filters and high-pass filter 84 included in respective ones of the first and fourth signal paths 34, 40 is preferably in the range of from about 3.5 to 10.4 GHz. More preferably, the frequency of the low-pass and high-pass filters 82, 84 for the first diplexer 20 is preferably about 7 GHz.

Each one of the diplexers (except for the diplexer containing the signal path 76 having the highest pass band) preferably terminates at a resistive attenuator 86. For the frequency range of from 2-50 GHz, six signal paths 76 and three diplexers are required. Preferably, the first and second diplexers 20, 22 operating in a lower pass band will be terminated at a resistive attenuator 86. The diplexer containing the highest operating signal path preferably omits the resistive attenuator 86 but rather inserts the resistive attenuator 86 between the signal path filter 78 and the low-pass filter 82 of the signal path 76 operating in the highest pass band. Preferably, the resistive attenuator 86 is rated at 3 dB but may be configured to operate at any value.

As was earlier mentioned, the switched multiplexer 10 includes the power combiner 62 which is connected to each one of the diplexers and which is configured to sum inputs received from the diplexers and generate a substantially stable multi-octave output impedance signal in response thereto. A transmitter 12 may be included with the switched multiplexer 10 and may be configured to generate the input signal 14 for delivery to the transmit switch 16. The transmit switch 16 is preferably configured to direct the transmit signal 18 to one of multiple outputs equal in quantity to the number of signal paths 76 required according to the above recited formula. For the frequency range of from 2-50 GHz, the transmit switch 16 may be configured as a single-pole-sextuple-throw switch.

Each one of the switches of respective ones of the signal paths 76 receives the transmit signal 18 from the transmit switch 16 at a respective input terminal thereof. The switches are configured to pass the transmit signal 18 onto respective ones of the signal path 76 high-pass filter 84, signal path 76 low-pass filter 82 or resistive attenuator 86. The transmitter 12 and/or the transmit switch 16 controls or directs the transmit signal 18 to the appropriate one of the switches 80. Remaining ones of the switches 80 which are not selected by the transmit switch 16 then terminate their input signal 14 into a resistive load. This allows a stable output impedance to be provided across the frequency band which is conveyed by the particular one of the signal path's filters 78 as seen from the point of view of the power combiner 62. For example, each one of the signal path filters 78 is either presented with a 50 ohm termination or an actual 50 ohm resistance is included with the transmitter 12 itself. This resistive termination stabilizes each one of the signal path filters' output impedance which therefore stabilizes the output impedance of the switched multiplexer 10.

Each one of the signal path filters 78 passes or transmits the desired portion of the transmit signal 18 within that particular signal path filter's 78 pass band. In addition, each one of the signal path filters 78 also rejects signal components that fall outside of the particular pass band such that each one of the signal path filters 78 may be viewed as either conductive within the pass band and also reflective. Because of the resistive termination, there exists a non-reflective component within all portions of the multi-octave frequency band that are then provided to the power combiner 62. Each one of the diplexers combine standard frequency bands with minimal loss to respective ones of the signal path filters' pass band thereby avoiding a 3 dB or more loss that is normally associated with a broad combiner. This arrangement also avoids disturbance of filter impedances in the rejection band. As was earlier mentioned, the signal paths 76 of the switched multiplexer 10 are combined to form each of the diplexers having non-adjacent frequency ranges such that a frequency gap allows a realizable diplexer to be designed with a crossover point that is within the frequency gap.

Each one of the low-pass and high-pass filters 82, 84 of a respective one of the diplexers operates at a frequency that is within the frequency gap. For example, for the case wherein the switched multiplexer 10 operates within the frequency range of from 2 to 50 GHz, the first diplexer 20 which is comprised of the signal path 76 (operating from 2 to 3.5 GHz) and the fourth signal path 36 (operating from 10.4 to 18 GHz), the high-pass filter 84 and low-pass filter 82 are preferably set at about 7 GHz. Likewise, for the second diplexer 22 in the above-described configuration, the second signal path 36 (operating from 3.5 to 6.0 GHz) may be paired with or combine with the fifth signal path (which operates from 18.0 to 30.0 GHz) wherein the desired frequency gap is from 6.0 to 18.0 GHz such that the high-pass filter 84 and low-pass filter 82 for such diplexer is preferably operating at about 12 GHz.

Finally, for the above-described switched multiplexer 10 configured to operate in the frequency range of from 2 to 50 GHz, the third diplexer which includes the third signal path 38 (operating from 6.0 to 10.4 GHz) and the sixth signal path (operating from 30.0 to 50.0 GHz), the preferred low-pass filter 82 and high-pass filter 84 operating frequency is about 20 GHz. In this manner, the first diplexer 20 creates a transparent path within the range of from about 2 to 3.5 GHz and from about 10.4 to 18.0 GHz respectively. The first diplexer 20 thereby created a near zero loss within the frequency bands of the first and fourth signal paths 34, 40 and presents a reflective impedance outside the first and fourth signal paths 34, 40.

Likewise, the second diplexer 22 creates a transparent path within the range of from about 3.5 to 6.0 GHz and from about 18.0 to 30.0 GHz, respectively. The second diplexer 22 also creates near zero loss within the frequency bands of the second and fifth signal paths and also presents a reflective impedance that is outside the bands of the second and fifth signal paths. Likewise, the third diplexer creates a near zero loss within the frequency bands of the third and sixth signal paths and presents a reflective impedance outside the third and sixth signal paths. The third diplexer creates a transparent path within the range of from about 6.0 to 10.4 GHz and from about 30.0 to 50.0 GHz, respectively. As was earlier mentioned, each one of the diplexers except for the diplexer containing the signal path 76 for the highest pass band terminates at a resistive attenuator 86.

For the frequency range of from 2-50 GHz, the first diplexer 20 includes a resistive attenuator 86 which connects the first and fourth signal paths 34, 40 together and which attenuates a diplexed signal that is produced by the first diplexer 20 by about three dB in order to reduce reflections from the first and fourth signal path filter pair at frequencies outside the pass bands (e.g., 2 to 3.5 GHz, 10.4 to 18.0 GHz). Likewise, the second diplexer 22 includes a resistive attenuator 86 which connects the second and fifth signal paths together and which attenuates a diplexed signal produced by the second diplexer 22 by about 3 dB also to reduce reflections from the second and fifth signal path filter pairs at frequencies outside the pass bands (e.g., 3.5 to 6.0 GHz, 18.0 to 30.0 GHz). The resistive attenuator 86 in the fifth signal path attenuates a filtered signal by about 3 dB in order to reduce the reflection from the signal path filter 78 outside of its pass band (e.g., 6.0 to 10.4 GHz). Because the sixth signal path does not necessarily require a signal path filter 78, the fifth signal path may include a resistive attenuator 86 that is interposed prior to the third diplexer that is formed by the low-pass filter 82 and high-pass filter 84 in order to prevent unnecessary loss of power to the sixth signal path.

Although the above-described embodiment is predicated on the case where the switched multiplexer 10 includes six signal paths and operates in the range of from 2 to 50 GHz, it is contemplated that the switched multiplexer 10 may be provided with any even number of signal paths and which are configured to filter input signals 14 in any frequency range. Toward this end, the transmit switch 16 may appropriately receive the input signal 14 and generate a transmit signal 18 in response thereto for delivery to the appropriate one of the signal paths. Likewise, the power combiner 62 is preferably configured to be complimentary to the required number of signal paths necessary to effectively filter the input signal 14 and to generate a substantially stable multi-octave input impedance signal in response thereto. In this regard, the power combiner 62 may be arranged as a three-way power combiner complimentary to the number of diplexers included in the switched multiplexer 10. In this regard, the power combiner 62 may be configured as a four-way power combiner for cases where there are four diplexer, etc.

Figure 2:
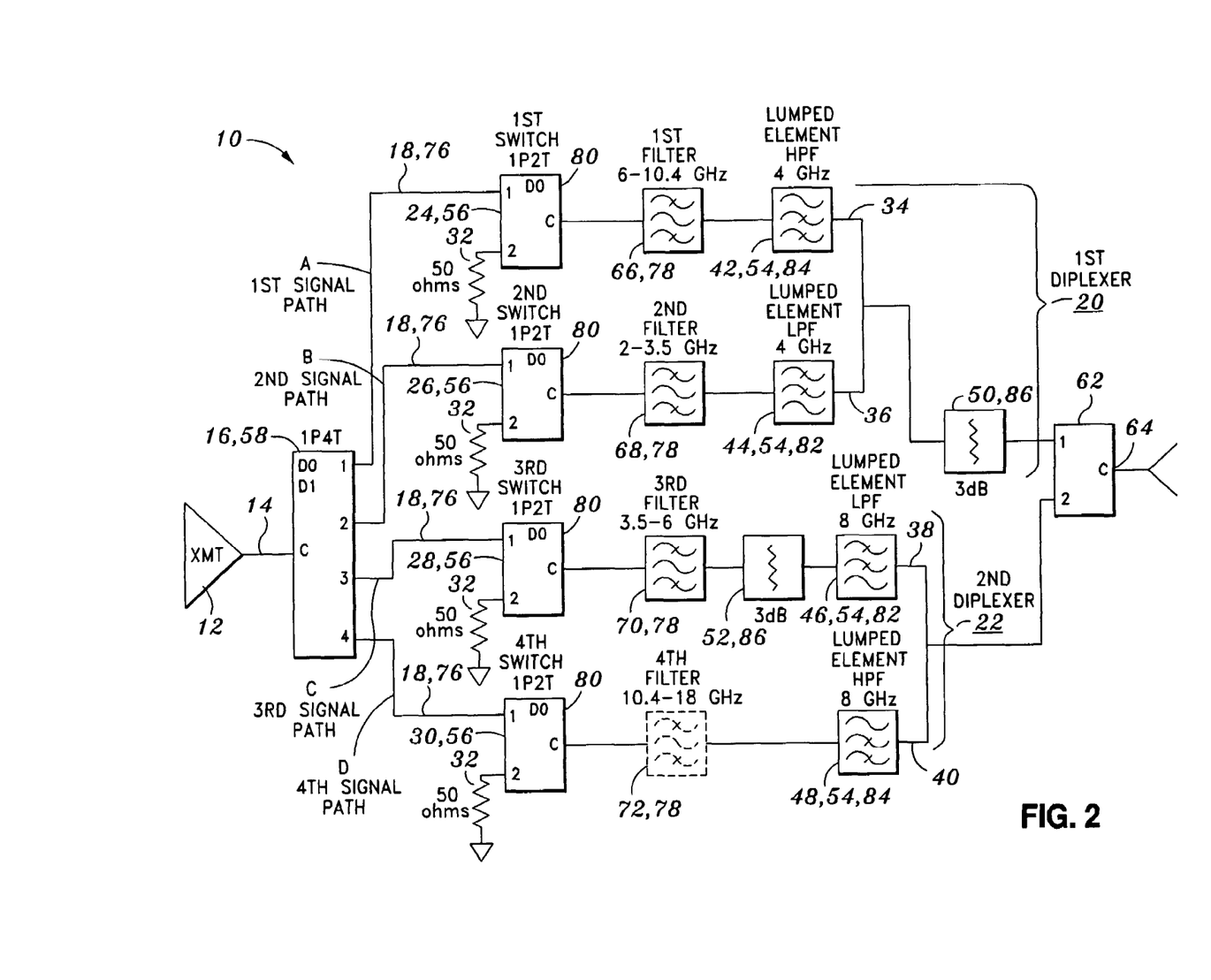
FIG. 2 is a schematic illustration of an exemplary embodiment of the switched multiplexer of the present invention comprising a transmit switch, a first diplexer connected in parallel with a second diplexer, and a power combiner.

Referring to FIG. 2, shown is the switched multiplexer 10 of the present invention in an exemplary embodiment comprising a transmit switch 16, a first diplexer 20 connected in parallel with a second diplexer 22, and a power combiner 62 connected to the first and second diplexers 20, 22. The first diplexer 20 includes a first signal path 34 connected in parallel with a second signal path 36. The first and second signal paths 34, 36 of the first diplexer 20 are terminated at a first diplexer resistive attenuator 50. Likewise, the second diplexer 22 is comprised of third and fourth signal paths 38, 40 which are connected in parallel with one another. The first signal path 34 includes a first switch 24. Likewise, the second signal path 36 includes a second switch 26. In the same manner, the third and fourth signal paths 38, 40 include respective ones of a third and fourth switch 28, 30.

As will become apparent in the following description, the switched multiplexer 10 combines several techniques and components in a unique way including use of the first and second diplexers 20, 22, incorporation of 50-ohm switch terminations, incorporation of resistive attenuators 86 as well as use of a broadband combiner or power combiner 62 to create a stable output impedance across the entire frequency range (e.g., 2-18 GHz) as different ones of the first, second, third and fourth signal paths 34, 36, 38, 40 are selected. Advantageously, such an arrangement provides an output impedance that may be presented to a stage following a switched multiplexer 10 circuit that is much more stable across the multi-octave frequency band than that which is available using a Switch-Filter-Switch (SFS) circuit. As was earlier mentioned, the benefit of stable output impedance is a reduction in phase and amplitude errors that may be otherwise caused during the selection of different filters during operation of the switched multiplexer 10.

As can be seen in FIG. 2, a transmitter 12 may be included with the switched multiplexer 10 and which may operate at some frequency within the multi-octave operating range (e.g., 2-18 GHz). The transmitter 12 is configured to generate an input signal 14 for delivery to the transmit switch 16. The transmitter 12 delivers the input signal 14 to a common port of a transmit switch 16 wherein the input signal 14 has a bandwidth that is sub-octave. In FIG. 2, the common port of the transmit switch 16 is indicated by the reference character "C".

The transmit switch 16 is configured to receive the input signal 14 from the transmitter 12 and to generate a transmit signal 18 in response to the input signal 14. In the embodiment shown, the transmit switch 16 directs the transmit signal 18 to one of four possible outputs designated in FIG. 2 by reference numerals 1-4. The transmit switch 16 may be configured in a variety of alternative configurations wherein the transmit switch 16 is configured as a single-pole-quadruple-throw (1P4T) switch 58. In this regard, the transmit switch 16 may be configured as a mechanical relay, as a diode or in any other variety of switching mechanisms. Regardless of its particular configuration, the transmit switch 16 is configured to connect the common port "C" to one of the four outputs indicated in FIG. 2 by transmit switch 16 reference numerals 1-4.

As was earlier mentioned, the switched multiplexer 10 includes the first diplexer 20 which is connected in parallel with the second diplexer 22. The first signal path 34 of the first diplexer 20 includes a first switch 24 that is interconnected to a first filter 66 by a first signal path high-pass filter (HPF) 42. As can be seen in FIG. 2, the first filter 66 preferably has a filtering capability in the range of from about 6-10.4 GHz. Likewise, the second signal path 36 includes a second switch 26 that is interconnected to a second filter 68 by a second signal path low-pass filter (LPF) 44. The second filter 68 preferably has a filtering capability in the range of from about 2-3.5 GHz.

In the arrangement of the second diplexer 22, the third signal path 38 includes a third switch 28 which is connected successively to a third filter 70, a third signal path resistive attenuator 52 and a third signal path LPF 46. The third filter 70 preferably has a filtering capability in the range of from about 3.5-6 GHz. The fourth signal path 40 includes a fourth switch 30 interconnected to a fourth signal path HPF 48.

Each one of the first, second, third and fourth switches 24, 26, 28, 30 are preferably configured to receive the transmit signal 18 from the transmit switch 16 at their respective input terminals designated in FIG. 2 by reference character "1". Each one of the first, second, third and fourth switches 24, 26, 28, 30 is further configured to pass the transmit signal 18 onto respective ones of the first signal path HPF 42, the second signal path LPF 44, the third signal path resistive attenuator 52 and the fourth signal path HPF 48. The transmit signal 18 is provided from an output terminal of each one of the first, second, third and fourth switches 24, 26, 28, 30 which may be configured as single-pole-double-throw (1P2T) switches 58. The output terminal of each one of the first, second, third and fourth switches 24, 26, 28, 30 is designated by reference character "C".

Selection of the appropriate one of the first, second, third and fourth switches 24, 26, 28, 30 may be controlled by some form of intelligence that is incorporated into the transmitter 12 and/or the transmit switch 16. Remaining ones of the first, second, third and fourth switches 24, 26, 28, 30 which are not selected by the transmit switch 16 or transmitter 12 terminate their input signal 14 into a resistive load or resistor 32 at terminal "2" as shown in each one of the switches. Such resistors provide a termination which emulates the termination seen at pin "1" of that same switch when the transmitter 12 is selected by the transmit switch 16. Each one of the first, second, third and fourth switches 24, 26, 28, 30 may preferably be configured as a single-pole-double-throw (1P2T) switch 58.

By including the resistive termination or resistor 32 with at least three of the first, second, third and fourth switches 24, 26, 28, 30, a stable output impedance is provided across the frequency band which is conveyed by the particular one of the signal path's filter (e.g., 2.0-3.5 GHz) as may be seen from the point of view of the output pin 64 shown in the schematic diagram. More specifically, each one of the first, second, third and fourth filters 66, 68, 70, 72 is either presented with a good 50-ohm termination or an actual 50-ohm resistance is included with the transmitter 12 itself. Such resistive termination stabilizes each one of the first, second, third and fourth filters' 66, 68, 70, 72 output impedance which therefore stabilizes the switched multiplexer 10 output impedance.

Each one of the first, second and third filters 66, 68, 70 passes or transmits the desired portion of the transmit signal 18 within that particular filter's pass band (e.g., 2.0-3.5 GHz). In addition, each one of the first, second and third filters 66, 68, 70 also rejects signal components (i.e., harmonics of that signal) that fall outside of the particular pass band (e.g., <2.0 GHz, >3.5 GHz). In this regard, each of the first, second and third filters 66, 68, 70 may be viewed as conductive (i.e., non-reflective) within the pass band and also reflective (i.e., outside of the pass band). Because each of the first, second and third filters 66, 68, 70 are either terminated by the resistor, respectively, or at the transmitter 12 itself, there exists a non-reflective component within all portions of the multi-octave frequency band that are then provided to the output pin 64.

It should be noted that the fourth signal path 40 does not necessarily include a filter. Because the fourth signal path 40 operates in the highest frequency band (i.e., 10.4-18.0 GHz), its lowest second harmonic (e.g., 10.4 GHz×2=20.8 GHz) may be attenuated by the power combiner 62 or at the output of the transmitter 12. However, it is contemplated that a fourth filter 72 could be interposed in the fourth signal path 40 such that the fourth filter 72 interconnects the fourth switch 30 to the fourth signal path HPF 48. If included, the fourth filter 72 preferably has a filtering capability in the range of from about 10.4 to about 18 GHz. As was earlier mentioned, the first filter 66 preferably has a filtering capability in the range of from about 6 to about 10.4 GHz. The second filter 68 has a filtering capability in the range of from about 2 to about 3.5 GHz. The third filter 70 preferably has a filtering capability in the range of from about 3.5 to about 6 GHz.

The first diplexer 20 and the second diplexer 22 comprise networks that combine standard frequency bands with minimal loss (e.g., <1 dB) to respective ones of the first, second, third and fourth filters' 66, 68, 70, 72 pass band. Such an arrangement avoids a 3 dB or more loss associated with a broadband combiner. Furthermore, the arrangement of the first and second diplexers 20, 22 avoids the disturbance of filter impedances in the rejection band (i.e., out of the pass band). Both of the signal paths 76 which combine to form each of the first and second diplexers 20, 22 have non-adjacent frequency ranges (e.g., 2-3.5 GHz and 6-10.4 GHz) such that a "gap" (e.g., 3.5-6 GHz) is created, allowing a realizable diplexer to be designed with a crossover point (e.g., 4 GHz) that is within the "gap".

Each one of the first signal path HPF 42 and second signal path LPF 44 is configured to operate at about 4 GHz. Likewise, each one of the third signal path LPF 46 and fourth signal path HPF 48 is configured to operate at about 8 GHz. In this manner, the first diplexer 20 network formed by the first signal path HPF 42 and the second signal path LPF 44 combine the first and second signal paths 34, 36 to create a transparent path within the range of from about 2.0 to about 3.5 GHz and from about 6.0 to about 10.4 GHz, respectively. The first and second signal paths 34, 36 of the first diplexer 20 thereby create a near-zero loss within the frequency bands of the first and second signal paths 34, 36 and present a reflective impedance outside the first and second signal paths 34, 36.

Likewise, the second diplexer 22 network formed by the third signal path LPF 46 and the fourth signal path HPF 48 combine the third and fourth signal paths 38, 40 to create a transparent path within the range of form about 3.5 to about 6.0 GHz and from about 10.4 to about 18.0 GHz, respectively. The third and fourth signal paths 38, 40 comprising the second diplexer 22 also creates near-zero loss within the frequency bands of the first and second signal paths 34, 36 and also present a reflective impedance that is outside bands of the first and second signal paths 34, 36.

As can be seen in FIG. 2, the first diplexer 20 includes a first diplexer resistive attenuator 50 which connects the first and second signal paths 34, 36 together. A diplexed signal produced by the first diplexer 20 is attenuated by the first diplexer resistive attenuator 50 by about 3 dB in order to reduce reflections from the first and second signal path filter pair at frequencies outside the pass bands (e.g., 3.5-6.0 GHz, >10.4 GHz). Such an arrangement presents a sufficiently good impedance both within the band (e.g., 2.0-3.5 GHz and 6.0-10.4 GHz) as well as out of band (e.g., 3.5-6.0 GHz and >10.4 GHz) to the power combiner 62 such that the power combiner 62 functions correctly and with an even split of power. Providing sufficiently good impedance to the power combiner 62 input terminal also serves to provide sufficiently good output impedance at the power combiner 62 output pin 64.

Likewise, in the third signal path 38, third signal path resistive attenuator 52 may be included therewithin and is preferably configured to attenuate a filtered signal by about 3 dB in order to reduce the reflection from the third filter 70 outside of its pass band (e.g., <3.5 GHz, >6 GHz). Because the fourth signal path 40 does not require a fourth filter 72, the third signal path resistive attenuator 52 may be interposed prior to the second diplexer 22 formed by the third signal path LPF 46 and the fourth signal path HPF 48 which prevents unnecessary loss of power to the fourth signal path 40. Such an arrangement is particularly useful because power is generally more expensive and difficult to generate at relatively high frequencies (e.g., 18 GHz) than at lower frequencies such as about 2 GHz.

The power combiner 62 shown in FIG. 2 may be arranged as a two-way power combiner 62 that is configured to operate in a range of from about 2 GHz to about 18 GHz and is configured to sum inputs received from each of the first and second diplexers 20, 22 at respective ones of the terminals indicated by the reference numerals "1" and "2" of the power combiner 62. Such an arrangement creates a multi-octave output (e.g., 2.0-18 GHz) at output pin 64. Nominal power loss through the power combiner 62 will be about 3 dB. Looking back into the switched multiplexer 10 circuit from the output pin 64, measurement of the output impedance is substantially constant in the range of from about 2 to about 18 GHz, regardless of which of the first, second, third or fourth signal paths 34, 36, 38, 40 are selected by the transmit switch 16.

The first diplexer 20 combines the first and second signal paths 34, 36 with a negligible reflection within the pass bands due to the stable load impedance provide by resistors of each one of the first, second, third and fourth switches 24, 26, 28, 30, as well as that provided by the transmitter 12. The first diplexer resistive attenuator 50 provides power balancing for the two-way power combiner 62. The second diplexer 22 and the third signal path resistive attenuator 52 also help to maintain an even power combining loss and a sufficiently good output impedance at output pin 64 of the power combiner 62.

Additional modifications and improvements may also be apparent to those of ordinary skill in the art. Thus the particular combination of parts described and illustrated herein is intended to represent only certain embodiments of the present invention, and is not intended to serve as limitations of alternative devices within the spirit and scope of the invention. Larger numbers of adjacent and sub-octave frequency paths could be combined, replicating the same techniques illustrated here with the four signal paths.

What is claimed is:

1. A switched multiplexer configured to combine a quantity of signal paths each covering a sub-octave in a frequency range, the switched multiplexer being configured to remove transmitter harmonics of an input signal to create a stable output impedance across the frequency range of from $f_{min}$ to $f_{max}$, the switched multiplexer comprising:

a transmit switch configured to receive the input signal and to generate a transmit signal in response thereto;

a plurality of diplexers connected in parallel with one another, each one of the diplexers being comprised of a non-adjacent pair of the signal paths connected in parallel with one another, each one of the diplexer terminating at a resistive attenuator except for the diplexer containing the signal path covering the highest pass band; and wherein:
the quantity of signal paths is determined by the formula:

$$n=[\log(f_{max}/f_{min})]/[\log 2]$$

with n being rounded up to the nearest even integer;
each one of the signal paths including a switch and a signal path filter interconnected by one of a low-pass filter and a high-pass filter, the signal path covering the highest pass band omitting the signal path filter;
the pass bands of the signal path filters being arranged to cover the frequency range with the lowest pass band being assigned to the first signal path and the next higher pass band being assigned to the next signal path up to the $n^{th}$ signal path, each pass band having a band width equal to about twice the band width of its next lower pass band;
the non-adjacent pair of signal paths assigned to each one of the diplexers being selected such that a frequency gap exists between the pass bands of the signal path filters of the pair;
each one of the low-pass and high-pass filters having a corner frequency falling between the frequency gap of the pass bands of the signal path filters of the pair;
a power combiner connected to the diplexers and being configured to sum inputs received therefrom and generate a substantially stable multi-octave output impedance signal in response thereto.

2. The switched multiplexer of claim 1 wherein the pass bands of the signal path filters are adjacent to one another.

3. The switched multiplexer of claim 1 wherein the pass band of the signal path filters overlap one another.

4. A switched multiplexer configured to combine first, second, third and fourth signal paths each covering a sub-octave in a frequency range of from about 2 to about 18 GHz and to remove transmitter harmonics of an input signal to create a stable output impedance across the frequency range, the switched multiplexer comprising:
a transmit switch configured to receive the input signal and to generate a transmit signal in response thereto
a first diplexer connected in parallel with a second diplexer, the first diplexer being comprised of first and second signal paths connected in parallel with one another and terminating at a first diplexer resistive attenuator, the second diplexer being comprised of third and fourth signal paths connected in parallel;
wherein:
the first signal path includes a first switch interconnected to a first signal path high-pass filter by a first filter, the first filter having a filtering capability in the range of from about 6 to about 10.4 GHz;
the second signal path including a second switch interconnected to a second signal path low-pass filter by a second filter, the second filter having a filtering capability in the range of from about 2 to about 3.5 GHz;
the third signal path including a third switch connected in succession to a third filter, a third signal path resistive attenuator and a third signal path low-pass filter, the third filter having a filtering capability in the range of from about 3.5 to about 6 GHz;
the fourth signal path including a fourth switch interconnected to a fourth signal path high-pass filter; and
a power combiner connected to the first and second diplexer and being configured to sum inputs receive therefrom and generate a substantially stable multi-octave output impedance signal in response thereto.

5. The switched multiplexer of claim 4 wherein at least one of the first, second, third and fourth switches is configured as a single-pole-double-throw switch having at least one port terminated at about 50 ohms.

6. The switched multiplexer of claim 4 wherein the first diplexer resistive attenuator and the third signal path resistive attenuators each have a resistance of about 3 dB.

7. The switched multiplexer of claim 4 wherein each one of the first signal path high-pass filter and second signal path low-pass filter is configured to operate at about 4 GHz.

8. The switched multiplexer of claim 4 wherein each one of the third signal path low-pass filter and fourth signal path high-pass filter is configured to operate at about 8 GHz.

9. The switched multiplexer of claim 4 wherein the fourth signal path includes a fourth filter interconnecting the fourth switch to the fourth signal path high-pass filter, the fourth filter having a filtering capability in the range of from about 10.4 to about 18 GHz.

10. The switched multiplexer of claim 4 wherein the transmit switch is configured as a single-pole-quadruple-throw switch.

11. The switched multiplexer of claim 4 wherein the transmit switch includes a switching mechanism being configured as a mechanical relay.

12. The switched multiplexer of claim 11 wherein the switching mechanism is configured as a diode.

13. The switched multiplexer of claim 4 wherein the two-way power combiner is configured to operate in the range of from about 2 to about 18 GHz.

14. The switched multiplexer of claim 4 further comprising a transmitter configured to generate the input signal for delivery to the transmit switch.

15. A method for removing transmitter harmonics from an input signal having a frequency range of from $f_{min}$ to $f_{max}$ and creating a stable output impedance across the frequency range using a switched multiplexer as claimed in claim 1, the method comprising the steps of:
(a) receiving the input signal at a transmit switch and generating a transmit signal in response thereto;
(b) selecting one of the signal paths for transmission of the transmit signal thereto;
(c) terminating the transmit signal at a resistive load of each one of the signal path switches of the non-selected ones of the signal paths;
(d) passing the transmit signal from the selected one of the switches to a respective one of the high-pass filters;
(e) filtering portions of the transmit signal that fall outside of the pass band of the high-pass filters; and
(f) summing inputs received from the diplexers at the power combiner; and
(g) generating the impedance signal in response to the inputs summed at the power combiner.

16. The switched multiplexer of claim 15 wherein the pass bands of the signal path filters of step (b) are adjacent to one another.

17. The switched multiplexer of claim 15 wherein the pass band of the signal path filters of step (b) overlap one another.

18. A method for removing transmitter harmonics from an input signal having a frequency range of from about 2 to about 18 GHz and creating a stable output impedance across the frequency range using a switched multiplexer comprising a first diplexer connected in parallel with a second diplexer and terminating at a power combiner, the first diplexer being comprised of first and second signal paths connected in parallel with one another and terminating at a first diplexer resistive attenuator, the second diplexer being comprised of third and fourth signal paths connected in parallel, the first, second, third and fourth signal paths each being configured to cover a sub-octave of the frequency range in which the switched multiplexer operates, the method comprising the steps of:

(a) receiving the input signal at a transmit switch and generating a transmit signal in response thereto;

(b) selecting one of the first, second, third and fourth signal paths for transmission of the transmit signal thereto, the first signal path including a first switch interconnected to a first signal path high-pass filter by a first filter, the first filter having a filtering capability in the range of from about 6 to about 10.4 GHz, the second signal path including a second switch interconnected to a second signal path low-pass filter by a second filter, the second filter having a filtering capability in the range of from about 2 to about 3.5 GHz, the third signal path including a third switch connected in succession to a third filter, a third signal path resistive attenuator and a third signal path low-pass filter, the third filter having a filtering capability in the range of from about 3.5 to about 6 GHz, the fourth signal path including a fourth switch interconnected to a fourth signal path high-pass filter;

(c) terminating the transmit signal at a resistive load of each one of the first, second, third and fourth switches of non-selected ones of the first, second, third and fourth signal paths;

(d) passing the transmit signal from the selected one of the first, second, third and fourth switches to a respective one of first, second, third filters and fourth signal path high-pass filter;

(e) filtering portions of the transmit signal that fall outside of the pass band of the first, second, third filters and fourth signal path high-pass filter; and (f) summing inputs received from the first and second diplexers at the power combiner; and (g) generating the output signal in response to the inputs summed at the power combiner.

19. The method of claim 18 wherein at least one of the first, second, third and fourth switches in step (b) is configured as a single-pole-double-throw switch having at least one port terminated at the resistive load.

20. The method of claim 18 wherein the resistive load in step (c) is about 50 ohms.

21. The method of claim 18 wherein the first diplexer resistive attenuator and the third signal path resistive attenuators in step (b) each have a resistance of about 3 dB.

22. The method of claim 18 wherein each one of the first signal path high-pass filter and second signal path low-pass filter in step (b) is configured to operate at about 4 GHz.

23. The method of claim 18 wherein each one of the third signal path low-pass filter and fourth signal path high-pass filter in step (b) is configured to operate at about 8 GHz.

24. The method of claim 18 wherein the fourth signal path in step (b) includes a fourth filter interconnecting the fourth switch to the fourth signal path high-pass filter, the fourth filter having a filtering capability in the range of from about 10.4 to about 18 GHz.

25. The method of claim 18 wherein the transmit switch in step (a) is configured as a single-pole-quadruple-throw switch.

26. The method of claim 18 wherein the transmit switch in step (a) includes a switching mechanism configured as a mechanical relay.

* * * * *